(12) United States Patent
Blair et al.

(10) Patent No.: US 6,663,296 B1
(45) Date of Patent: Dec. 16, 2003

(54) OPTOELECTRIC MODULE

(76) Inventors: Thomas H. Blair, 117 S. Bernal Rd., San Jose, CA (US) 95119; Phillip J. Edwards, 6721 Positano La., San Jose, CA (US) 95138; Siegfried Fleischer, 106470 Rosewood Rd., Cupertino, CA (US) 95014; Michael S. Lebby, 30 N. La Barge Rd., Apache Junction, AZ (US) 85219; Bradley S. Levin, 628 Forest Ave., Apt. C., Palo Alto, CA (US) 94301; Oliver W Northrup, 1336 Gilmore St., Mountain View, CA (US) 94040; Michael M. O'Toole, 5913 Foligno Way, San Jose, CA (US) 95138; Joseph John Vandenberg, 415 N. Lark Ellen Ave., West Covina, CA (US) 91791

( * ) Notice: Subject to any disclaimer, the term of this patent is extended or adjusted under 35 U.S.C. 154(b) by 17 days.

(21) Appl. No.: 10/128,102

(22) Filed: Apr. 23, 2002

Related U.S. Application Data (60) Provisional application No. 60/285,733, filed on Apr. 23, 2001.

(51) Int. Cl.[7] ............................... G02B 6/00; G02B 6/36
(52) U.S. Cl. .......................................... 385/92; 385/147
(58) Field of Search ............................... 385/88–93, 147

(56) References Cited

U.S. PATENT DOCUMENTS

| | | | | |
|---|---|---|---|---|
| 5,107,445 A | * | 4/1992 | Jensen et al. | 374/161 |
| 5,764,826 A | * | 6/1998 | Kuhara et al. | 385/24 |
| 6,348,986 B1 | * | 2/2002 | Doucet et al. | 398/128 |
| 6,508,595 B1 | * | 1/2003 | Chan et al. | 385/92 |
| 6,547,452 B1 | * | 4/2003 | Chan et al. | 385/88 |

* cited by examiner

*Primary Examiner*—Akm Enayet Ullah
(74) *Attorney, Agent, or Firm*—Parsons & Goltry; Robert A. Parsons; Michael W. Goltry (57) ABSTRACT

An optoelectric module includes a cylindrical ferrule defining an optical axis and having a first end constructed to receive an optical fiber aligned along the optical axis. An optical element, including a lens, is engaged in the ferrule between the first and second ends and positioned to convey light along the optical axis. The second end of the ferrule is closed by a base. An optical component is mounted on the base so that light is directed through the lens from the optical component to the optical fiber or from the optical fiber to the optical component. Either a laser driver or an amplifier is mounted on the base and electrically connected to the optical component and external connections are made to the laser driver or the amplifier by electrical traces on a surface of the base, vias through the base, or flex leads mounted on the base.

38 Claims, 6 Drawing Sheets

OPTOELECTRIC MODULE

CROSS-REFERENCE TO RELATED APPLICATION

This application claims the benefit of U.S. Provisional Application Serial No. 60/285,733, filed Apr. 23, 2001.

FIELD OF THE INVENTION

This invention relates to optical-to-electrical and electrical-to-optical modules and more particularly to optical mounting features in such modules.

BACKGROUND OF THE INVENTION

In optical-to-electrical and electrical-to-optical (hereinafter "optoelectric") modules used in the various communications fields, one of the most difficult problems that must be solved is the provision of adequate, inexpensive optical elements and the alignment of these elements. Providing this efficient fabrication and alignment requires very precise assembly procedures. Here it will be understood by those skilled in the art that the term "light", as used throughout this disclosure, is a generic term which includes any electromagnetic radiation that can be modulated and transmitted by optical fibers or other optical transmission lines (which at the present time is generally in the infrared range).

Much of the optoelectric module fabrication difficulty and expense is due to mounting and shielding difficulties of optical components, such as lasers, light emitting diodes, photodiodes, etc. Generally, there are two types of lasers that are used in optoelectric modules, edge emitting lasers and surface emitting lasers. Edge emitting lasers emit light in a path parallel to the mounting surface while surface emitting lasers emit light perpendicular to the mounting surface. The light from either of the lasers must then be directed into an optical fiber for transmission to a remotely located light receiver (i.e., a photodiode or the like). Lens systems are used at both ends of the optical fiber to direct light from a light generating component into the optical fiber and to direct light from the optical fiber onto a light sensing component.

The apparatus used to mount the optical components and the lens systems can have a substantial effect on the construction of the optical systems and the assembly procedures for the optical systems. Also, the mounting structure for the optical components and the lens system must be very rugged and stable so that alignment is not disturbed by use or temperature changes. Further, the entire module must be shielded from external signals and the like and to prevent radiation to other external devices or modules, (e.g., electromagnetic interference (EMI)).

It would be highly advantageous, therefore, to remedy the foregoing and other deficiencies inherent in the prior art.

Accordingly, it is an object the present invention to provide new and improved optical component and optical element mounting and alignment apparatus.

Another object of the present invention is to provide new and improved optical component and optical element mounting and alignment apparatus which is rugged and stable.

Another object of the present invention is to provide new and improved optical component and optical element mounting and alignment apparatus which is shielded to prevent radiation into and/or out of the module.

And another object of the present invention is to provide new and improved optical component and optical element mounting and alignment apparatus which improve the fabrication efficiency and manufacturing capabilities of optoelectric modules.

Still another object of the present invention, is to provide new and improved optical component and optical element mounting and alignment apparatus which allows the use of a variety of optical components and component materials.

SUMMARY OF THE INVENTION

Briefly, to achieve the desired objects of the present invention in accordance with a preferred embodiment thereof, provided is an optoelectric module including a cylindrical ferrule defining an optical axis and having a first end constructed to receive an optical fiber aligned along the optical axis and a second end. An optical element is engaged in the cylindrical ferrule between the first end and the second end. The optical element includes a lens positioned to convey light along the optical axis. A base is affixed adjacent the second end of the cylindrical ferrule so as to close the second end. An optical component is mounted on the base within the cylindrical ferrule so that light conveyed along the optical axis is directed through the lens of the optical element along the optical axis from the optical component to the optical fiber or from the optical fiber to the optical component. Either a laser driver or an amplifier is mounted on the base and electrically connected to the optical component by either electrical traces on a surface of the base, vias through at least a portion of the base, or flex leads mounted at least partially on the base. External connections are made to the laser driver or the amplifier by either electrical traces on a surface of the base, vias through at least a portion of the base, or flex leads mounted at least partially on the base.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF THE DRAWINGS

Figure 1:
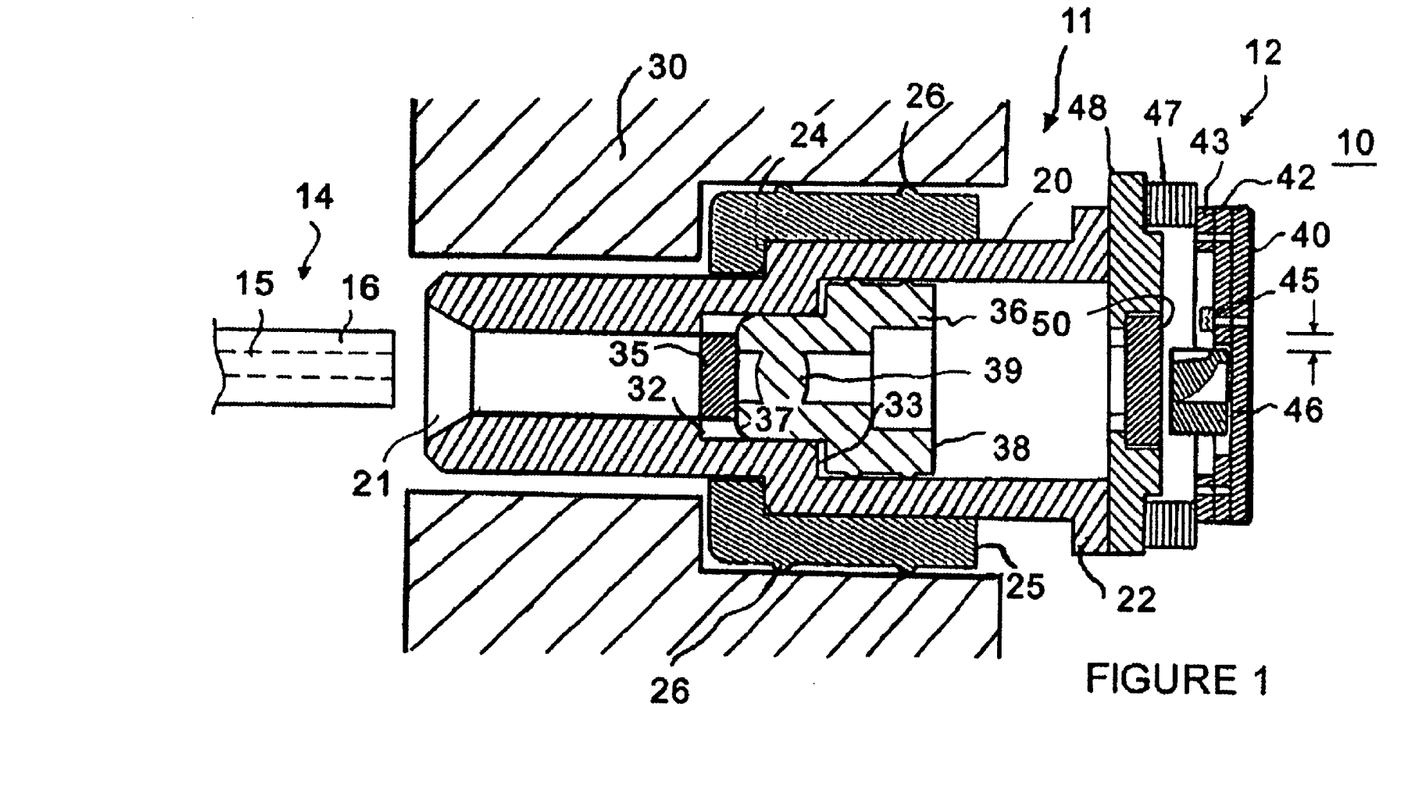
FIG. 1 is a sectional view of an optical/electrical module in accordance with the present invention.

Referring to FIG. 1, a sectional view of either an optical-to-electrical or electrical-to-optical (hereinafter referred to as optical/electrical) module 10 in accordance with the present invention. It will be understood by those skilled in the art that modules of the type discussed herein generally include a pair of channels, one of which receives electrical signals, converts the electrical signals to optical (light) beams by way of a laser or the like and introduces them into one end of an optical fiber, which then transmits the modulated optical beams to external apparatus. The second channel of the module receives modulated optical beams from an optical fiber connected to the external apparatus, conveys the modulated optical beams to a photo diode or the like, which converts them to electrical signals. In the following description, the apparatus and methods can generally be used in either of the channels but, since the optical portions of the two channels are substantially similar, only one channel will be discussed with the understanding that the description applies equally to both channels.

Module 10 of FIG. 1 includes a receptacle assembly 11 and an optoelectric package 12 aligned and affixed together, as will be disclosed in more detail below. Receptacle assembly 11 is designed to receive an optical fiber 14 in communication therewith, in a manner that will become clear presently. While optical fiber 14 is illustrated as a bare, unsupported fiber for simplicity, it will be understood that optical fibers are generally terminated in a ferrule or other structure specifically designed for plugging into receiving openings and that such structures are intended to be included herein. In this embodiment, optical fiber 14 is a single mode fiber (the use of which is one of the major advantages of the present invention) including a glass core 15 and a cladding layer 16. Receptacle assembly 11 includes an elongated cylindrical ferrule 20 defining a fiber receiving opening 21 at one end and a mounting flange 22 at the opposite end.

Ferrule 20 has a radially outward directed step 24 formed in the outer periphery to operate as a stop for a resilient sleeve 25. Sleeve 25 has an inwardly directed flange formed adjacent one end so as to engage step 24 and prevent relative longitudinal movement between ferrule 20 and sleeve 25. Sleeve 25 also includes radially outwardly directed ribs or protrusions 26 in the outer periphery which are designed to frictionally engage the inner periphery of a mounting housing 30. Thus, to easily and conveniently mount module 10 in housing 30, ferrule 20 with sleeve 25 engaged thereover is press-fit into the circular opening in housing 30 and frictionally holds module 10 in place. Preferably, sleeve 25 is formed, completely or partially, of some convenient resilient material and may be electrically conductive or non-conductive as required in the specific application.

Progressing from end 21 toward end 22, ferrule 20 has two radially outwardly directed steps 32 and 33. Step 32 provides a surface or stop for the mounting of an optical spacer 35 and step 33 provides a surface or stop for the positioning of an optical lens assembly 36. In this preferred embodiment, lens assembly 36 is formed of plastic and may be, for example, molded to simplify manufacturing of module 10. It should be understood that the term "plastic" is used herein as a generic term to describe any non-glass optical material that operates to transmit optical beams of interest therethrough and which can be conveniently formed into lenses and the like. For example, in most optical modules used at the present time the optical beams are generated by a laser that operates in the infra-red band and any materials that transmit this light, including some oxides and nitrides, come within this definition.

Lens assembly 36 defines a central opening for the transmission of light therethrough from an end 37 to an opposite end 38. A lens 39 is integrally formed in the central opening a fixed distance from end 37. Lens assembly 36 is formed with radially outwardly projecting ribs or protrusions in the outer periphery so that it can be press-fit into ferrule 20 tightly against spacer 35. Thus, lens assembly 36 is frictionally held in place within ferrule 20 and holds spacer 35 fixedly in place. Also, lens 39 is spaced a fixed and known distance from spacer 35. In this preferred embodiment, optical fiber 14 in inserted into ferrule 20 so that glass core 15 buts against spacer 35, which substantially reduces or suppresses return reflections.

Optoelectric package 12 includes a base or support plate 40 and a mounting plate 42 positioned thereon. One or more spacer rings 43 may be positioned on plate 42 to provide sufficient distance for components mounted thereon. In this example a laser 45 is mounted on the upper surface of mounting plate 42 and positioned to transmit light generated therein to a lens block 46. Alternatively, laser 45 could be a photodiode or the like. Lens block 46 is mounted on mounting plate 42 by some convenient means, such as outwardly extending ears (not shown). A ring 47 is positioned on spacer rings 43 and a cap or cover 48 is affixed to ring 47. Generally, the entire assembly, including plate 40, mounting plate 42, spacer rings 43, ring 47 and cover 48 are fixedly attached together by some convenient means, such as welding, gluing, etc. so that laser 45 is enclosed in a hermetically sealed chamber. However, a hermetic seal is not necessary in many embodiments in which the laser or photodiode used is either separately sealed or is not sensitive to atmospheric conditions.

A window 50 is sealed in cover 48 so as to be aligned with lens block 46. Lens block 46 redirects light from laser 45 at a ninety degree angle out through window 50 and may include one or more lenses or optical surfaces, as will be explained in more detail below. Further, lens block 46 may be molded from plastic for convenience in manufacturing.

Optoelectric package 12 is affixed to receptacle assembly 11 with flange 22 of ferrule 20 butting against the upper surface of cover 48. Further, optoelectric package 12 is optically aligned with receptacle assembly 11 so that light from laser 45 is directed into core 15 of optical fiber 14. This alignment can be accomplished in different ways but one reliable method is known as active alignment. In this process, laser 45 is activated and receptacle assembly 11 is positioned approximately over optoelectric package 12. The light in optical fiber 14 is measured and the alignment is adjusted for maximum light. When maximum light is measured alignment has been achieved and receptacle assembly 11 is fixed to optoelectric package 12 by some convenient means, such as welding or adhesive.

Figure 2:
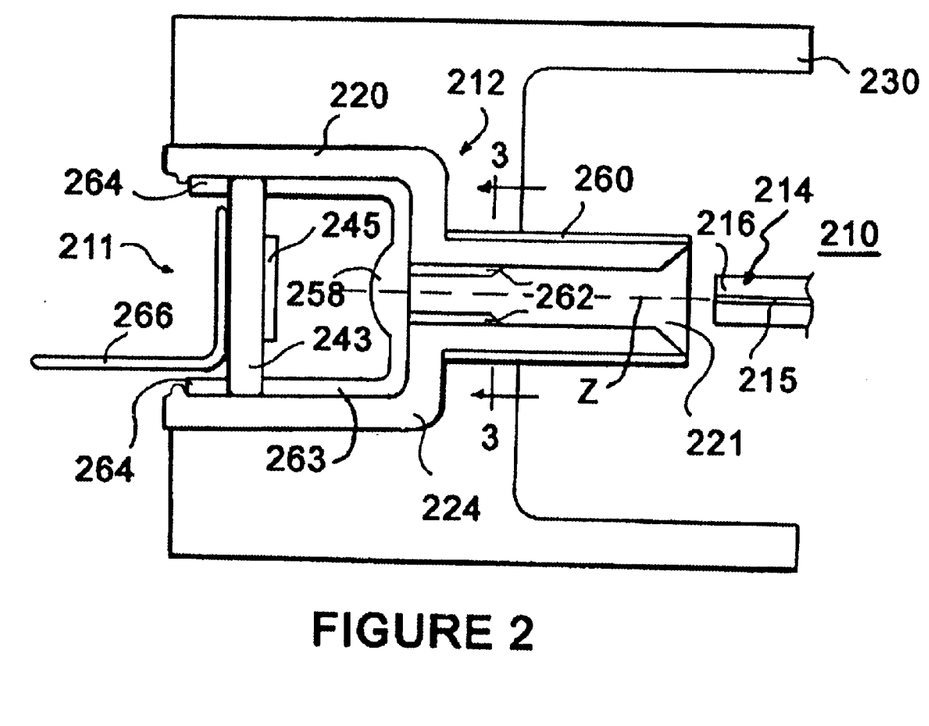
FIG. 2 is a simplified sectional view of another embodiment of an optical/electrical module in accordance with the present invention.

Turning now to FIG. 2, a simplified sectional view is illustrated of a complete optical/electrical module 210 including a receptacle assembly 211 and an optoelectric package 212 aligned and affixed together generally as described with reference to module 10 of FIG. 1. Receptacle assembly 211 is designed to receive an optical fiber 214 in communication therewith. In the preferred embodiment, optical fiber 214 is a single mode fiber including a glass core 215 and a cladding layer 216. Receptacle assembly 211 includes an elongated cylindrical ferrule 220 defining a fiber receiving opening 221 at one end. Ferrule 220 has a radially outward directed step 224 formed in the outer periphery to operate as a stop for mounting ferrule 220 in a housing 230. Thus, to easily and conveniently mount module 210 in housing 230, ferrule 220 is press-fit into the circular opening in housing 230, which frictionally holds module 210 in place. It will be understood that a sleeve, such as sleeve 25 described in conjunction with FIG. 1 above, could be included to mount ferrule 220 in housing 230. The sleeve, if included, can be formed completely or partially of some convenient resilient material and may be electrically conductive or non-conductive as required in the specific application.

Figure 3:
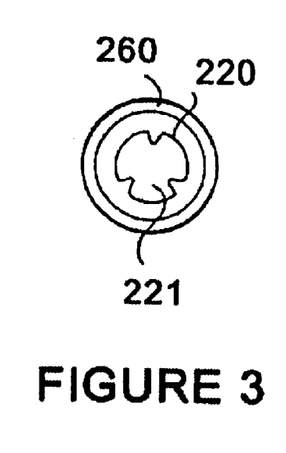
FIG. 3 is a sectional view as seen from the line 3—3 of FIG. 2.

In this specific embodiment, ferrule 220 is molded or otherwise conveniently formed of plastic and crush ribs 262 are provided in the inner periphery, of the portion of ferrule 220 adjacent optical fiber receiving opening 221. See FIG. 3 for a sectional view. Crush ribs 262 not only serve to allow a greater tolerance in the manufacturing process, but they tend to center optical fiber 214 within the receiving opening and to frictionally lock it in place. In this embodiment, ferrule 220 includes a metal sleeve. 260 molded into or deposited on the outer surface so as to electrically contact metal housing 230. It will be understood that crush ribs similar to ribs 262 or ribs 26 (see FIG. 1) can be included on ferrule 220 to frictionally engage ferrule 220 in housing 230, if desired. In another embodiment, ferrule 220 can be molded with a centrally located conductive layer sandwiched between layers of plastic. In either case, metal sleeve 260 or the sandwiched conductive layer are included to provide EMI protection or screening and can also provide a hermetic seal in some instances. Metal sleeve 260 also ensures a tight tolerance on opening 221.

A lens 258 is formed as a generally cup-shaped plastic element 263 with lens 258 positioned in the bottom of the cup and aligned along the optical or Z axis. Cup-shaped plastic element 263 is positioned in ferrule 220 and held fixedly in place by frictional engagement or stops formed in the inner periphery of ferrule 220. Crush ribs 264 are formed in the inner periphery of cup-shaped plastic element 263 adjacent the rim or exterior end. A mounting plate 243, with a VCSEL 245 (or other laser and driver, if desired) mounted thereon is provided. In this embodiment, as an example of an easily assembled structure, a flex lead 266 is attached to the rear surface of mounting plate 243 to provide external contacts to VCSEL 245 and any other electronics mounted thereon. A copending provisional application, entitled "Optical/Electrical Module", filed of even date herewith, and incorporated herein by reference, describes a variety of methods and apparatus for mounting and positioning lasers and associated drivers and other electronics. Mounting plate 243, with VCSEL 245 and flex lead 266 attached, is simply pressed into the opening in cup-shaped plastic element 263. Crush ribs 264 not only center but frictionally engage mounting plate 243 in the opening. To provide for a more secure engagement of mounting plate 243, mounting plate 243 can be provided with longitudinally extending channels in the periphery that mate with crush ribs 264. Mounting plate 243 can then be inserted into the opening in cup-shaped plastic element 263 and rotated to lock it firmly in place.

In this embodiment, mounting plate 243 may be, for example, a laminated ceramic plate, a common semiconductor substrate, or the like with connecting traces and mounting pads built-in. VCSEL 245 is mounted on mounting plate 243 so as to emit light directly along the optical or Z axis into receptacle assembly 211. Lens 258, which may be for example a molded lens, is positioned between laser 245 and receptacle assembly 211 to provide initial optical power. It will be understood that the entire lens mounting assembly and lens 258 can be molded in a single unit, as shown, or lens 258 can be positioned in a separate mounting structure if desired.

Figure 4:
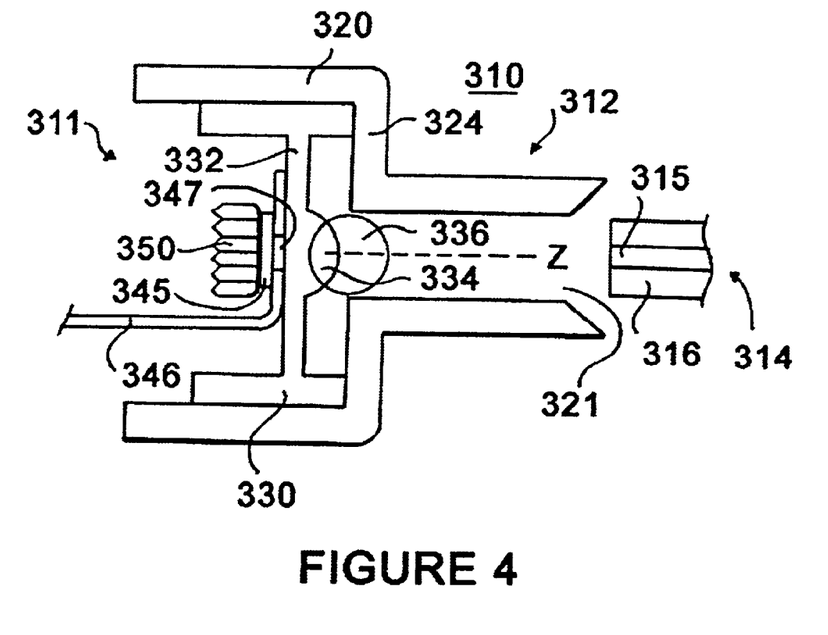
FIG. 4 is a simplified sectional view of another embodiment of an optical/electrical module in accordance with the present invention.

Turning now to FIG. 4, a simplified sectional view is illustrated of a complete optical/electrical module 310 including a receptacle assembly 311 and an optoelectric package 312 aligned and affixed together generally as described with reference to module 10 of FIG. 1. Receptacle assembly 311 is designed to receive an optical fiber 314 in communication therewith. In the preferred embodiment, optical fiber 314 is a single mode fiber including a glass core 315 and a cladding layer 316. Receptacle assembly 311 includes an elongated cylindrical ferrule 320 defining a fiber receiving opening 321 at one end. Ferrule 320 has a radially outward directed step 324 formed in the outer periphery to operate as a stop for mounting ferrule 320 in a housing (not shown). The inner surface of step 324 also operates as a stop or mounting surface for receptacle assembly 311, as explained in more detail below.

In this embodiment, the lens system includes a tubular element 330 with an outer diameter approximately equal to the inner diameter (the left end in FIG. 4) of ferrule 320. Tubular element 330 forms a support or mounting structure for receptacle assembly 311 and is designed to be press fit into ferrule 320 with an inner end butting against step 324 of ferrule 320. Tubular element 330 is further formed with a centrally located mounting plate 332 for receiving electronics components and optical components thereon. In this embodiment, tubular element 330 and mounting plate 332 are integrally molded from plastic or the like with mounting plate 332 formed as an integral web, diaphragm, or wall within tubular member 330. Also, tubular element 330 includes a plastic lens 334 molded integrally into mounting plate 332 so as to be positioned centrally along the optical or Z axis.

If desired, an additional lens or lenses can be incorporated between mounting plate 332 and ferrule 320. For example, a spherical glass lens or ball 336 is formed with a diameter larger than the diameter of opening 321 in ferrule 320. Ball 336 can be included in addition to plastic lens 334 or, if desired, mounting plate 332 can be formed flat (without lens 334) and ball 336 can be included instead of lens 334. Other and/or additional lenses and optical elements can be included as described above or in any of the copending provisional applications entitled "Optical/Electrical Module", filed on Mar. 12, 2001, and incorporated herein by reference.

A laser 345, which may be any of the various types mentioned above but which in this embodiment is a VCSEL, is mounted on one surface of a flex lead 346. An opening 347 is provided through flex lead 346 to allow passage of light from laser 345 therethrough. Flex lead 346 is fixedly attached to the rear surface of mounting plate 332 so that the light output of laser 345 and opening 347 are aligned along the optical or Z axis with lens 334 and/or 336. Thus, with optical fiber 314 inserted into opening 321 of ferrule 320 so as generally to but against lens 334 or 336, lens 334 and/or 336 direct light from laser 345 into core 315 of optical fiber 314. As will be understood, tubular element 330, mounting plate 332, flex lead 346, and laser 345 are assembled as a unit (receptacle assembly 311) and then inserted into ferrule 320 to complete module 310.

It may be desirable to attach a heat sink 350 to laser 345 to conduct heat from the unit. Heat sink 350 can be physically attached to some further heat conducting body (not shown) as is understood in the art. Further, in applications including high frequency operation, drivers and other electronics can be attached to flex lead 346 within tubular element 330 and interconnected to laser 345 and external circuitry by flex lead 346. Also, in at least some applications it may be desirable to encapsulate receptacle assembly 311 by filling the rear portion of ferrule 320 and tubular element 330 with an encapsulating material (not shown). The encapsulating material can be, or can include, a material that provides hermeticity and/or EMI screening if desired.

Figure 5:
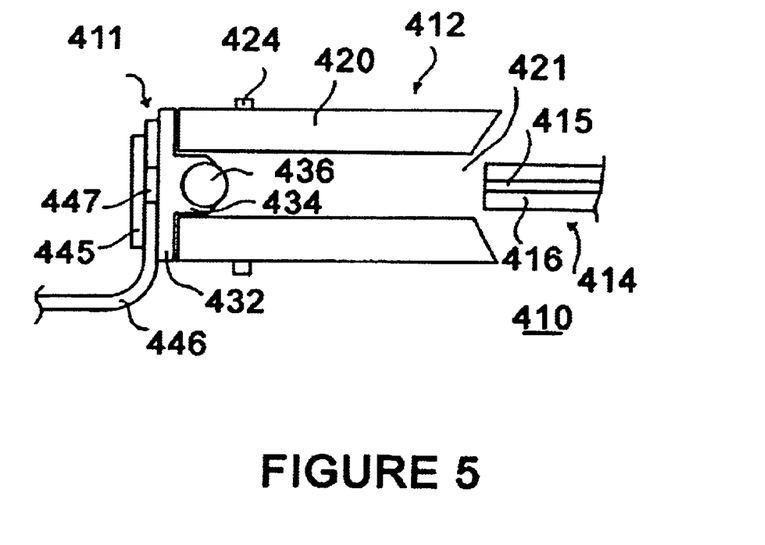
FIG. 5 is a simplified sectional view of a modified optical/electrical module similar to the embodiment illustrated in FIG. 4.

Turning now to FIG. 5, a simplified sectional view is illustrated of a complete optical/electrical module 410 including a receptacle assembly 411 and an optoelectric package 412 aligned and affixed together generally as described with reference to module 10 of FIG. 1. Receptacle assembly 411 is designed to receive an optical fiber 414 in communication therewith. In the preferred embodiment, optical fiber 414 is a single mode fiber including a glass core 415 and a cladding layer 416. Receptacle assembly 411 includes an elongated cylindrical ferrule 420 defining a fiber receiving opening 421 and extending generally uniformly through ferrule 420. Ferrule 420 can be mounted within a housing (not shown) by any of the apparatus and methods described above or can simply be press fit into an opening in a housing until a stop rib 424 in the outer periphery buts against the housing.

In this embodiment, receptacle assembly 411 includes a mounting plate 432 with an outer diameter approximately equal to the outer diameter of ferrule 420. A plastic lens 434 is molded integrally into mounting plate 432 so as to be positioned centrally along the optical or Z axis. Mounting plate 432 is mounted against the rear end of ferrule 420 with plastic lens 434 extending into the longitudinal opening 421 of ferrule 420. If desired, an additional lens or lens can be incorporated between mounting plate 432 and ferrule 420. For example, a spherical glass lens or ball 436 is formed with a diameter smaller than the diameter of opening 421 in ferrule 420. Ball 436 can be included in addition to plastic lens 434 or, if desired, a cylindrical step can be formed on mounting plate 432 with a diameter approximately equal to the inner diameter of opening 421 in ferrule 420. Ball 436 can be imbedded into the cylindrical step to hold it in an aligned position and ball 436 can be included instead of lens 434. Other and/or additional lenses and optical elements can be included as described above or in any of the copending provisional applications entitled "Optical/Electrical Module", filed on Mar. 12, 2001, and incorporated herein by reference.

A laser 445, which may be any of the various types mentioned above but which in this embodiment is a VCSEL, is mounted on one surface of a flex lead 446. An opening 447 is provide through flex lead 446 to allow passage of light from laser 445 therethrough. Flex lead 446 is fixedly attached to the rear surface of mounting plate 432 so that the light output of laser 445 and opening 447 are aligned along the optical or Z axis with lens 434 and/or ball 436. Thus, with optical fiber 414 inserted into opening 421 of ferrule 420 so as generally to but against lens 434 or ball 436, lens 434 and/or ball 436 direct light from laser 445 into core 415 of optical fiber 414. As will be understood, mounting plate 432, flex lead 446, and laser 445 are assembled as a unit (receptacle assembly 411) and then affixed to ferrule 420 to complete module 410.

It may be desirable to attach a heat sink to laser 445 to conduct heat from the unit. The heat sink can be physically attached to some further heat conducting body as is understood in the art. Further, in applications including high frequency operation, drivers and other electronics can be attached to flex lead 446 on mounting plate 432 and interconnected to laser 445 and external circuitry by flex lead 446. Also, in at least some applications it may be desirable to encapsulate receptacle assembly 411 by encapsulating the rear portion of ferrule 420 and receptacle assembly 411 with a suitable material. The encapsulating material can be, or can include, a material that provides hermeticity and/or EMI screening if desired.

Figure 6:
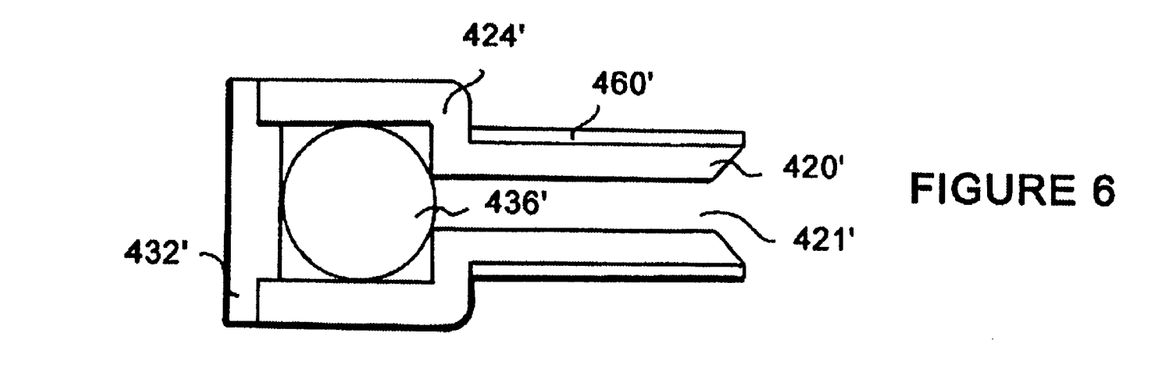
FIG. 6 is a simplified sectional view of a modified housing for use in an optical/electrical module in accordance with the present invention.

Referring additionally to FIG. 6, a simplified sectional view is illustrated of a modified housing for use in an optical/electrical module, such as those described in FIGS. 4 and 5. In this illustration the modification is to a module similar to module 410 of FIG. 5 and, accordingly, components similar to those illustrated in FIG. 5 are designated with similar numbers and a prime is added to indicate the different embodiment. In this embodiment, ferrule 420' is formed with a radially outwardly extending shoulder 424'. Thus, the central opening at the left end of ferrule 420' (as seen in FIG. 6) has a larger diameter than opening 421'. Also, the length of ferrule 420' from step 424' to the left end is approximately equal to, or slightly longer than, the larger diameter of the central opening.

A spherical glass lens or ball 436' with a diameter approximately equal to the larger diameter is inserted into the central opening from the left end of ferrule 420'. Mounting plate 432' (with laser, flex lead, etc. attached as described in conjunction with FIG. 5) is attached to the left end of ferrule 420' to capture glass ball 436' fixedly in the opening. Ferrule 420' includes a metal sleeve 460' molded into or deposited on the outer surface so as to electrically contact a metal housing (not shown). In another embodiment, ferrule 420' can be molded with a centrally located conductive layer sandwiched between layers of plastic. In either case, metal sleeve 460' or the sandwiched conductive layer are included to provide EMI protection or screening and can also provide a hermetic seal in some instances. Glass ball 436' can include electrically conductive material to further enhance EMI screening, if desired.

Figure 7:
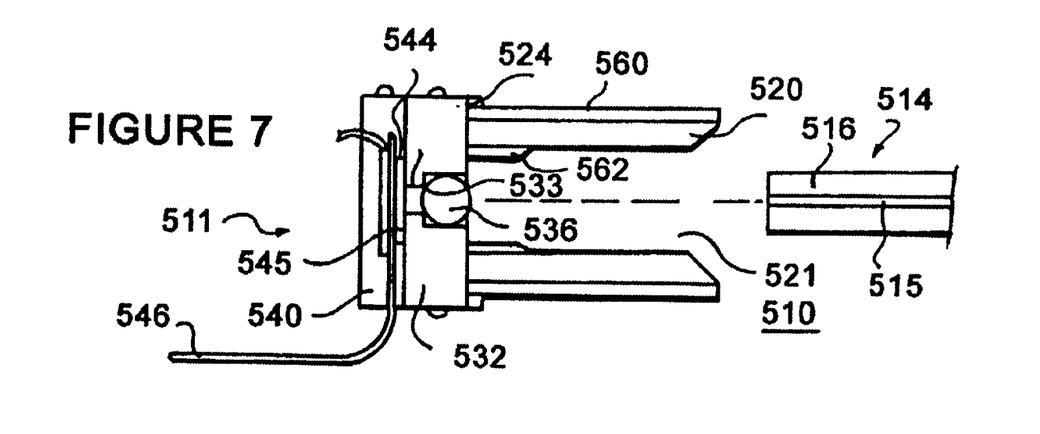
FIG. 7 is a simplified sectional view of another embodiment of an optical/electrical module in accordance with the present invention.

Turning now to FIG. 7, a simplified sectional view is illustrated of a complete optical/electrical module 510 including a receptacle assembly 511 and an optoelectric package 512 aligned and affixed together generally as described with reference to module 10 of FIG. 1. Receptacle assembly 511 is designed to receive an optical fiber 514 in communication therewith. In the preferred embodiment, optical fiber 514 is a single mode fiber including a glass core 515 and a cladding layer 516. Receptacle assembly 511 includes an elongated cylindrical ferrule 520 defining a fiber receiving opening 521 at one end.

In this embodiment, ferrule 520 is constructed with an integral circular wall 532 formed at the end opposite opening 521. Circular wall 532 has an outer diameter larger than the outer diameter of the remainder of ferrule 520 so as to define a radially outwardly extending shoulder 524, which may be used when mounting module 510 in an opening in a housing. Thus, to easily and conveniently mount module 510 in a housing, ferrule 520 is press-fit into a circular opening in the housing up to and in abutting engagement with shoulder 524, which frictionally holds module 510 in place.

In this specific embodiment, ferrule 520 is molded or otherwise conveniently formed of plastic and crush ribs 562 are provided in the inner periphery of the portion of ferrule 520 adjacent optical fiber receiving opening 521. Crush ribs 562 not only serve to allow a greater tolerance in the manufacturing process, but they tend to center optical fiber 514 within the receiving opening and to frictionally lock it in place. In this embodiment, ferrule 520 includes a metal sleeve 560 molded into or deposited on the outer surface so as to electrically contact a metal housing. In another embodiment, ferrule 520 can be molded with a centrally located conductive layer sandwiched between layers of plastic. In either case, metal sleeve 560 or the sandwiched conductive layer are included to provide EMI protection or screening and can also provide a hermetic seal in some instances.

Circular wall 532 of ferrule 520 is formed to define a central cylindrically shaped depression or cavity 533 axially aligned along the optical or Z axis. The diameter and depth of cavity 533 is designed to receive a spherical glass lens or ball 536 with an approximately equal diameter so that glass ball 536 can be press fit into cavity 533 and is fixedly captured therein. A central opening 534 is formed through circular wall 532 in the bottom of cavity 533 and axially aligned along the optical or Z axis. When properly positioned in cavity 533, glass ball 536 will extend slightly into opening 534, which will provide some aid in properly aligning the various components if, for example, the diameter of cavity 533 is slightly larger than the diameter of glass ball 536.

Receptacle assembly 511 includes a housing 540 that may be, for example, a molded housing in which a flex lead 546 is insert molded. In this process, flex lead 546 is held in the desired position in the mold (e.g. so as to extend outwardly from one or both sides) and housing 540 is molded around flex lead 546 so that mounting pads and electrical traces are exposed within a cavity 544. For additional information on molded housings of this type, see a copending provisional application entitled "Optical Electrical Module", filed on Mar. 12, 2001, and incorporated herein by reference. A laser 545, in this embodiment a VCSEL, is then physically and electrically mounted on flex lead 546 within cavity 544. Housing 540 is then mounted on the rear surface of circular wall 532 of ferrule 520 so that laser 545 emits light along the optical or Z axis through opening 534 and into glass ball 536.

It will be understood that various alignment features (e.g. pegs, grooves, etc.) can be incorporated into either or both housing 540 and circular wall 532 to properly align the elements for light emission along the optical or Z axis. Alternatively, housing 540 can be moved relative to circular wall 532 during an active alignment process and, once properly aligned, can be fixed by some convenient means such as adhesive, solder, welding etc. Thus, with optical fiber 514 inserted into opening 521 of ferrule 520 so as generally to but against glass ball 536, glass ball 36 directs light from laser 545 into core 515 of optical fiber 514.

Figure 8:
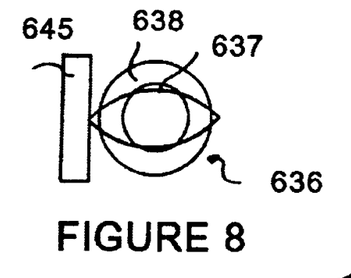
FIG. 8 is a schematic view of a modified lens system for use in an optical/electrical module in accordance with the present invention.

Referring additionally to FIG. 8, a modified lens system is illustrated which can be used with any of the above described modules and is particularly useful in the embodiments describing a spherical glass lens or ball. In the schematic diagram of FIG. 8, a VCSEL type laser is designated with number 645. It will of course be understood that the lens system could be used with substantially any type of laser and a VCSEL is illustrated for simplicity.

In present day lasers, because of the portion of the infra red band utilized, VCSELs are generally fabricated with an indium phosphide active area and at least one indium phosphide mirror stack or distributed Bragg reflector (DBR). Thus, in this example, the index of refraction of laser 645 is the index of refraction of indium phosphide, designated $n_1$ (approximately 3.5). A spherical glass lens or ball, designated 636, includes an inner layer or core 637 and an outer layer 638. Layer 638 is formed of a material (such as glass, magnesium fluoride, or other polymers) with an index of refraction $n_1$ (approximately 1 to 2.5) less than the index of refraction $n_2$ of core 637. Core 637 is formed of material with an index of refraction $n_2$ (in a range of approximately 2.5 to 3.5) much greater than the index of refraction $n_1$ of layer 638. Additional layers, such as an anti-reflective coating or coatings, or the like, can be included if desired. Here it should be understood that layer 638 (and any additional layers that might be included) can be accurately formed with a desired or predetermined thickness. Thus, a primary purpose of layer 638 is to accurately space core 637 a fixed distance from laser 645.

Figure 9:
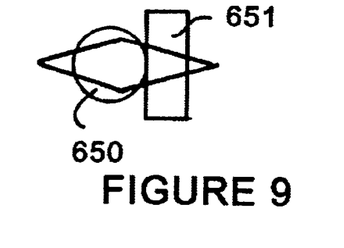
FIGS. 9 and 10 are schematic and perspective views, respectively, of another modified lens system for use in an optical/electrical module in accordance with the present invention.
Figure 10:
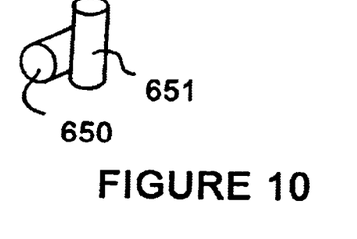

Referring additionally to FIGS. 9 and 10, a simpler embodiment of the glass lenses or balls disclosed above is illustrated. In this embodiment, crossed glass rods 650 and 651 are used. The rods are positioned so as to be perpendicular to each other and, as illustrated schematically in FIG. 9, provide the same focusing effect as a spherical glass ball. The major difference here is that the glass rods are much cheaper to manufacture than glass balls.

Figure 11:
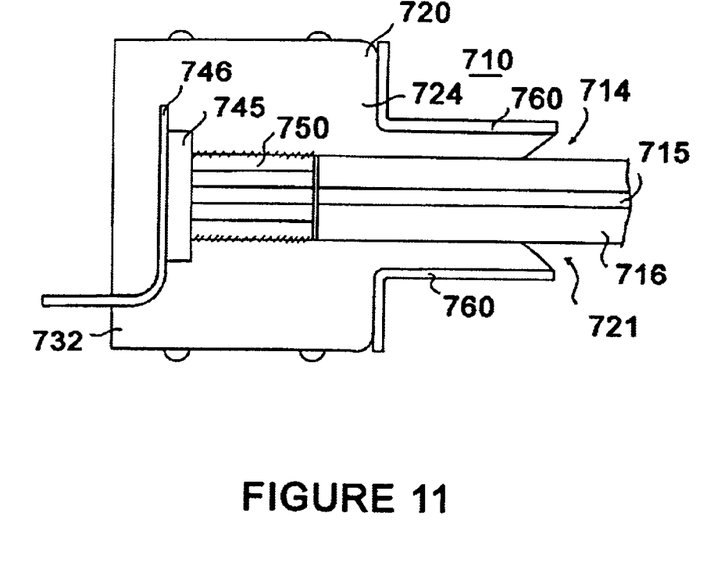
FIG. 11 is a simplified sectional view of another embodiment of an optical/electrical module in accordance with the present invention.

Turning now to FIG. 11, a simplified sectional view is illustrated of a complete optical/electrical module 710 including a receptacle assembly 711 and an optoelectric package 712 aligned and affixed together generally as described with reference to module 10 of FIG. 1. Receptacle assembly 711 is designed to receive an optical fiber 714 in communication therewith. In the preferred embodiment, optical fiber 714 is a single mode fiber including a glass core 515 and a cladding layer 716. Receptacle assembly 711 includes an elongated cylindrical ferrule 720 defining a fiber receiving opening 721 at one end. In this embodiment, ferrule 720 is molded with an integral housing 732 formed at the end opposite opening 721. Housing 732 has an outer diameter larger than the outer diameter of the remainder of ferrule 720 so as to define a radially outwardly extending shoulder 724, which may be used when mounting module 710 in an opening in a housing. Thus, to easily and conveniently mount module 710 in a housing, ferrule 720 is press-fit into a circular opening in the housing up to and in abutting engagement with shoulder 724, which frictionally holds module 710 in place.

In the preferred process of molding ferrule 720, a laser 745 (in this example a VCSEL) is physically and electrically attached to a flex lead 746. A stub 750 of optical fiber, similar to optical fiber 714, is provided. The glass core of stub 750 is optically aligned with the light output of laser 745 and the elements are held in this position in a mold. Ferrule 720, with housing 732 surrounding laser 745, stub 750 and the end of flex lead 746, is then molded so that the free end of stub 750 is optically aligned with and forms the inner end of opening 721. Thus, with optical fiber 714 inserted into opening 721 of ferrule 720 so as generally to but against stub 750, light from laser 745 is directed through stub 750 and into core 715 of optical fiber 714. Stub 750 prevents damage to the emitting surface of laser 745 during fabrication and also prevents damage to the emitting surface of laser 745 during assembly or subsequent connecting and disconnecting of optical fiber 714. In a preferred embodiment of the stub arrangement described above, the numerical aperture of laser 745 matches the numerical aperture of stub 750 for best optical coupling.

Figure 12:
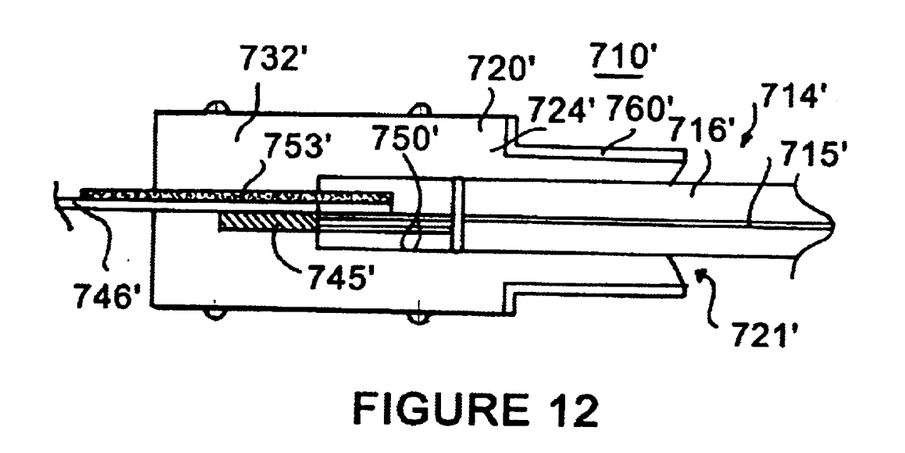
FIG. 12 is a simplified sectional view of a modified optical/electrical module similar to the embodiment illustrated in FIG. 11.

Referring additionally to FIG. 12, another embodiment is illustrated of an optical/electrical module, designated 710', that is similar to module 710 of FIG. 11. In this embodiment, components similar to components in FIG. 11 are designated with a similar number and have a prime added to indicate the different embodiment. In this embodiment, the structure is basically similar to module 710 and will not be explained at length. Here the difference is that laser 745' is an edge emitting laser (Fabery Perot) or the like and, consequently, flex lead 746' extends out the rear end of molded housing 732' with the edge emitting area of laser 745' aligned with the core of stub 750'.

Figure 13:
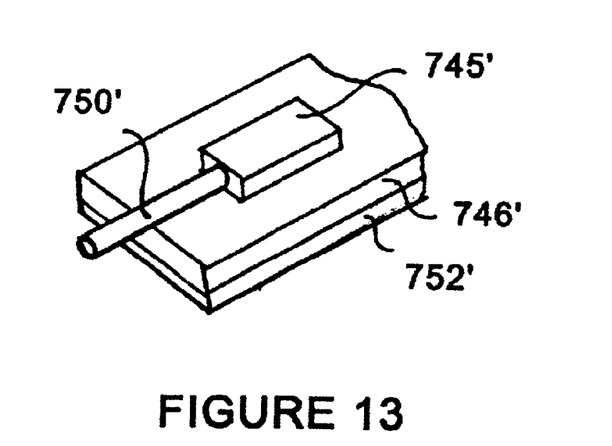
FIG. 13 is a simplified perspective view of a portion of the module illustrated in FIG. 12.

An additional feature that is disclosed in this embodiment but which can be used equally well in the embodiment of FIG. 11, is the use of a copper strip 752' as a heat sink. Copper strip 752' is positioned in parallel abutting engagement with flex lead 746', as illustrated in more detail in FIG. 13, and may provide additional heat transfer through metal portions included in flex lead 746'. Copper strip 752' extends to the exterior of housing 732' where it can be connected to a heat dissipating body in a well known fashion.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An optoelectric module comprising:
    a cylindrical ferrule defining an optical axis and having a first end constructed to receive an optical fiber aligned along the optical axis and a second end;
    an optical element engaged in the cylindrical ferrule between the first end and the second end, the optical element including a lens positioned to convey light along the optical axis;
    a base affixed adjacent the second end of the cylindrical ferrule so as to close the second end;
    an optical component mounted on the base within the cylindrical ferrule so that light conveyed along the optical axis is directed through the lens of the optical element along the optical axis from the optical component to the optical fiber or from the optical fiber to the optical component;
    one of a laser driver and an amplifier mounted on the base and electrically connected to the optical component by one of electrical traces on a surface of the base, vias through at least a portion of the base, and flex leads mounted at least partially on the base; and
    external connections to the one of the laser driver and the amplifier by one of electrical traces on a surface of the base, vias through at least a portion of the base, and flex leads mounted at least partially on the base.

2. An optoelectric module as claimed in claim 1 wherein the optical element includes a plastic cup-shaped element with the lens positioned in the bottom of the cup and aligned along the optical axis, the cup-shaped element being frictionally engaged in the cylindrical ferrule with the sides of the cup substantially parallel to sides of the cylindrical ferrule.

3. An optoelectric module as claimed in claim 2 wherein the cylindrical ferrule and the cup-shaped element are radially symmetrical for providing alignment of the lens along the optical axis.

4. An optoelectric module as claimed in claim 2 wherein the plastic cup-shaped element includes crush ribs on an interior surface for receiving and frictionally engaging the base.

5. An optoelectric module as claimed in claim 4 wherein the cylindrical ferrule is formed of plastic and includes crush ribs on an interior surface adjacent the first end for receiving and frictionally engaging the optical fiber.

6. An optoelectric module as claimed in claim 1 wherein the cylindrical ferrule is formed of plastic and further includes a metal sleeve engaged over at least a portion of the cylindrical ferrule to provide EMI screening.

7. An optoelectric module as claimed in claim 1 wherein the lens in the optical element includes a spherical lens or ball.

8. An optoelectric module as claimed in claim 7 wherein the spherical lens or ball is formed of glass.

9. An optoelectric module as claimed in claim 8 wherein the spherical glass lens or ball is positioned in the cylindrical ferrule to abuttingly engage a glass core of the optical fiber.

10. An optoelectric module as claimed in claim 1 wherein the lens in the optical element includes first and second rods with a circular cross-section positioned in abutting engagement with longitudinal axes perpendicular to each other, the rods being positioned in the cylindrical ferrule so that a point of contact of the rods is in the optical axis.

11. An optoelectric module as claimed in claim 10 wherein the rods are formed of glass.

12. An optoelectric module as claimed in claim 11 wherein the glass rods are positioned in the cylindrical ferrule to abuttingly engage a glass core of the optical fiber adjacent the point of contact of the rods.

13. An optoelectric module as claimed in claim 1 wherein the external connections include flex leads having a front surface attached to the optical element and the base attached to a rear, opposed surface, the flex leads further defining an opening therethrough for conveying light to or from the optical component mounted on the base.

14. An optoelectric module as claimed in claim 13 including in addition a heat sink positioned in abutting engagement with a rear surface of the base.

15. An optoelectric module as claimed in claim 1 wherein the base includes a molded plastic element and the external connections include flex leads molded into the plastic element, the flex leads having the optical component mounted on a front surface.

16. An optoelectric module as claimed in claim 1 wherein the optical element and lens engaged in the cylindrical ferrule includes an optical fiber stub with a glass core, the stub being molded into the cylindrical ferrule so that the glass core of the stub is positioned along the optical axis of the cylindrical ferrule with a first end abutting the optical component and a second end coaxially abutting a core of the optical fiber received in the first end of the cylindrical ferrule.

17. An optoelectric module as claimed in claim 16 wherein the cylindrical ferrule includes molded plastic and the optical fiber stub is molded into the cylindrical ferrule, the external connections are flex leads having the optical component mounted thereon, and the flex leads are molded into the base with the base being molded as a portion of the cylindrical ferrule.

18. An optoelectric module as claimed in claim 17 including in addition a heat sink affixed to the flex lead adjacent the optical component and molded into the base so as to extend partially outward external to the base.

19. An optoelectric module comprising:
- a molded, radially symmetrical cylindrical ferrule defining an optical axis and having a first end constructed to receive an optical fiber aligned along the optical axis and a second end;
- a molded optical element engaged in the cylindrical ferrule between the first end and the second end and positioned to convey light along the optical axis;
- a flex lead affixed adjacent the second end of the cylindrical ferrule for providing external connections to the optical component; and
- an optical component mounted on the flex lead so that light conveyed along the optical axis is directed through the optical element along the optical axis from the optical component to the optical fiber or from the optical fiber to the optical component.

20. An optoelectric module as claimed in claim 19 wherein the optical element includes a plastic cup-shaped element with a lens positioned in the bottom of the cup and aligned along the optical axis, the cup-shaped element being frictionally engaged in the cylindrical ferrule with the sides of the cup substantially parallel to sides of the cylindrical ferrule.

21. An optoelectric module as claimed in claim 20 wherein the cylindrical ferrule and the cup-shaped element are radially symmetrical for providing alignment of the lens along the optical axis.

22. An optoelectric module as claimed in claim 21 wherein the plastic cup-shaped element includes crush ribs on an interior surface for receiving and frictionally engaging the base.

23. An optoelectric module as claimed in claim 22 wherein the cylindrical ferrule is formed of plastic and includes crush ribs on an interior surface adjacent the first end for receiving and frictionally engaging the optical fiber.

24. An optoelectric module as claimed in claim 19 wherein the cylindrical ferrule is formed of plastic and further includes a metal sleeve engaged over at least a portion of the cylindrical ferrule to provide EMI screening.

25. An optoelectric module as claimed in claim 19 wherein the optical element includes a spherical lens or ball.

26. An optoelectric module as claimed in claim 25 wherein the spherical lens or ball is formed of glass.

27. An optoelectric module as claimed in claim 26 wherein the spherical glass lens or ball is positioned in the cylindrical ferrule to abuttingly engage a glass core of the optical fiber.

28. An optoelectric module as claimed in claim 19 wherein a lens in the optical element includes first and second rods with a circular cross-section positioned in abutting engagement with longitudinal axes perpendicular to each other, the rods being positioned in the cylindrical ferrule so that a point of contact of the rods is in the optical axis.

29. An optoelectric module as claimed in claim 28 wherein the rods are formed of glass.

30. An optoelectric module as claimed in claim 29 wherein the glass rods are positioned in the cylindrical ferrule to abuttingly engage a glass core of the optical fiber adjacent the point of contact of the rods.

31. An optoelectric module as claimed in claim 19 wherein a front surface of the flex leads is attached to the optical element and the optical component is positioned adjacent a rear opposed surface of the flex leads, the flex leads further define an opening therethrough for conveying light to or from the optical component.

32. An optoelectric module as claimed in claim 31 including in addition a heat sink positioned in abutting engagement with a rear surface of the flex lead.

33. An optoelectric module as claimed in claim 19 further including a molded plastic element positioned to close the second end of the cylindrical ferrule, the flex leads being molded into the plastic element with the optical component mounted on a front surface.

34. An optoelectric module as claimed in claim 19 wherein the optical element engaged in the cylindrical ferrule includes an optical fiber stub with a glass core, the stub being molded into the cylindrical ferrule so that the glass core of the stub is positioned along the optical axis of the cylindrical ferrule with a first end abutting the optical component and a second end coaxially abutting a core of the optical fiber received in the first end of the cylindrical ferrule.

35. An optoelectric module as claimed in claim 34 including in addition a heat sink affixed to the flex lead adjacent the optical component and molded into the base so as to extend partially outward external to the base.

36. An optoelectric module comprising:
- a molded, radially symmetrical cylindrical ferrule defining an optical axis and having a first end constructed to receive an optical fiber aligned along the optical axis and a second end;
- a molded optical element engaged in the cylindrical ferrule between the first end and the second end and positioned to convey light along the optical axis;
- a flex lead molded into the radially symmetrical cylindrical ferrule adjacent the second end of the cylindrical ferrule for providing external connections to the optical component; and
- an optical component mounted on the flex lead so that light conveyed along the optical axis is directed through the optical element along the optical axis from the optical component to the optical fiber or from the optical fiber to the optical component.

37. An optoelectric module as claimed in claim 36 wherein the optical element engaged in the cylindrical ferrule includes an optical fiber stub with a glass core, the stub being molded into the cylindrical ferrule so that the glass core of the stub is positioned along the optical axis of the cylindrical ferrule with a first end abutting the optical component and a second end coaxially abutting a core of the optical fiber received in the first end of the cylindrical ferrule.

38. An optoelectric module as claimed in claim 37 including in addition a heat sink affixed to the flex lead adjacent the optical component and molded into the cylindrical ferrule so as to extend partially outward external to the cylindrical ferrule.

\* \* \* \* \*